United States Patent [19]

Takezawa et al.

[11] Patent Number: 5,188,878
[45] Date of Patent: Feb. 23, 1993

[54] UNIDIRECTIONAL THIN GLASS PREPREG

[75] Inventors: Makoto Takezawa; Makiji Miyao; Shinkichi Murakami; Akihiro Atsumi, all of Tokyo, Japan

[73] Assignee: Tonen Corporation, Tokyo, Japan

[21] Appl. No.: 876,814

[22] Filed: Apr. 29, 1992

Related U.S. Application Data

[63] Continuation of Ser. No. 615,772, Nov. 19, 1990, abandoned.

[30] Foreign Application Priority Data

Nov. 24, 1989 [JP] Japan ................................. 1-306211

[51] Int. Cl.$^5$ ............................................. B32B 5/12
[52] U.S. Cl. ................................... 428/114; 428/292; 428/294; 428/417; 428/902
[58] Field of Search ............... 428/292, 294, 417, 902, 428/114

[56] References Cited

U.S. PATENT DOCUMENTS

| | | | |
|---|---|---|---|
| 4,056,651 | 11/1977 | Scola | 428/336 |
| 4,264,278 | 4/1981 | Weingart | 428/222 |
| 4,273,601 | 6/1981 | Weingart | 428/222 |
| 4,680,224 | 7/1987 | O'Connor | 428/902 |
| 4,714,642 | 12/1987 | McAhley et al. | 428/408 |
| 4,714,648 | 12/1987 | Nagata | 428/408 |
| 4,909,872 | 1/1990 | Jarmon | 428/294 |
| 4,921,558 | 5/1990 | Johnson et al. | 428/294 |
| 4,960,629 | 10/1990 | Jarmon et al. | 428/294 |
| 5,045,388 | 9/1991 | Bice et al. | 428/902 |
| 5,122,417 | 6/1992 | Murakami et al. | 428/408 |
| 5,128,199 | 7/1992 | Iyer et al. | 428/408 |

FOREIGN PATENT DOCUMENTS 60-011315 1/1985 Japan .
63-074606 4/1988 Japan .

OTHER PUBLICATIONS

Molyneux; M., "Prepreg Tape and Fabric Technology for Advanced Composites", *Composites*, vol. 14, No. 2, Gildford, Surrey, Great Britain, pp. 87–91 (1983).

Lissac, P., et al., "Nappe Ou Tissu? Comment Choisir Lors De La Fabrication D'une Pice Composite?", *Composites*, vol. 25, No. 3, Paris, France, pp. 69–77 (1985).

*Primary Examiner*—James J. Bell
*Attorney, Agent, or Firm*—Seidel, Gonda, Lavorgna & Monaco

[57] ABSTRACT

A flexible unidirectional glass prepreg comprising glass rovings having a thickness of 50 to 150 μm and formed of glass fiber monofilaments having a diameter of 10 to 20 μm and a matrix resin impregnated between the fiber monofilaments.

4 Claims, No Drawings

UNIDIRECTIONAL THIN GLASS PREPREG

This is a continuation of co-pending application Ser. No. 07/615,772 filed on Nov. 19, 1990 now abandoned.

FIELD OF THE INVENTION

The present invention relates to a unidirectional thin glass prepreg in which glass fibers as reinforcing fiber are arranged in one direction in a thin layer.

PRIOR ART

Unidirectional thin glass prepregs comprising a thin layer of glass fibers as reinforcing fiber unidirectionally arranged and impregnated with a matrix resin such as an epoxy resin are known.

This unidirectional thin glass prepregs have transparency and, when attached to some object for reinforcing purposes, allow it's surface to be seen through the attached transparent prepreg, so that the prepreg may ornament the appearance of an object reinforced by the prepreg attached thereon. The prepregs, therefore, may be preferably used as the material to reinforce the surfaces of fishing rods, golf clubs, and the like.

Such type of unidirectional thin glass prepregs can be obtained by spreading glass rovings each of which is converged of a number of monofilaments of glass fiber, while arranging the monofilaments in one direction in a thin layer either on a sheet of resin coated paper comprising a release paper and a matrix resin which is coated on the inside of the release paper or between two sheets of resin coated paper, and applying heat and pressure to them from outside of the paper so that the resin can permeate between the monofilaments and can simultaneously become B-staged.

PROBLEMS TO BE SOLVED BY THE INVENTION

Prior unidirectional thin glass prepregs, however, have drawbacks of inhomogeneity, significant unevenness in weight distribution, poor physical properties such as strength, and additionally the presence of voids therein making them whitish and not sufficiently clear. Further, they do not have a smooth surface in ordinary cases, but have a finely wavy surface in extreme cases. Consequently, when prepregs are laid on and applied to the surface of an object which is to be strengthened by them, air bubbles may be entrained either between the superposed prepregs or between the prepreg and the object to be strengthened. Such air bubbles would hinder the prepregs from fully exhibiting their capability of reinforcing the object.

In view of the foregoing, it is strongly desired to develop an improved unidirectional thin glass prepreg which is homogeneous, has excellent physical properties such as strength, is well transparent, and has a smooth surface, whereby it can be laid on and applied to an object to be strengthened without the entraining of air bubbles and thus can fully exhibit the intended reinforcing property. Unfortunately, no prepregs having such properties have been proposed.

SUMMARY OF THE INVENTION

An object of the present invention is therefore to provide a unidirectional thin glass prepreg having the above properties.

The above object is achieved by the unidirectional thin glass prepreg according to the present invention. Briefly, the present invention resides in a unidirectional thin glass prepreg comprising glass fiber monofilaments which are formed by spreading glass rovings without being doubled and which are unidirectionally arranged in a thin layer, and a matrix resin, wherein each of said monofilaments has a diameter of 10 to 20 $\mu$m and wherein said prepreg has a thickness of 50 to 150 $\mu$m. Preferably, said matrix resin is an epoxy type resin and each of said glass rovings has converged monofilaments of less than 2000.

DETAILED DESCRIPTION OF THE PREFERRED EMBODIMENT

The inventors have made energetic efforts to develop a unidirectional thin glass prepreg which is homogeneous, has excellent physical properties such as strength, is well transparent, and has a smooth surface, whereby it can be laid on and applied to an object to be strengthened without the entraining of air bubbles and thus can fully exhibit the intended reinforcing property. As a result, the followings have been revealed:

An ordinary glass roving is manufactured by converging several hundreds of monofilaments of glass fiber into a single thread, and again converging several or several tens of such monofilament threads into a single fiber strand, i.e. a glass roving. Since ordinary glass rovings are thus subjected to two converging operations in the course in which monofilaments are formed into a single fiber strand, they are not converged in the fiber strand in an orderly manner; that is, monofilaments are twisted, distorted, and wound around one another. Consequently, when the glass rovings are spreaded and the spreaded glass fiber monofilaments of the rovings are unidirectionally arranged in a thin layer on a resin coated paper sheet, or between two resin coated paper sheets, the arranged monofilaments are twisted, distorted or wound around one another, so that it is impossible for a resin to fully permeate between the monofilaments. Therefore, the conventional prepreg is such that the monofilaments are not arranged in an orderly manner and the resin is not homogeneously permeated. In addition, the prepreg may include voids present between the monofilaments resulting in making the prepreg whitish and unclear, and would further have a not smooth, but finely wavy surface.

In contrast, in a roving without being doubled formed by a single operation of converging monofilaments of glass fiber into a strand or roving, the monofilaments are generally arranged in an orderly manner in the strand and only few monofilaments are twisted, distorted or mutually wound around. Consequently, when the glass rovings without being doubled are spreaded and the glass fiber monofilaments formed by the spreading are unidirectionally arranged in a thin layer on a resin coated paper sheet, or between two resin coated paper sheets, the arranged monofilaments are orderly and are not twisted, distorted or wound around one another, so that it is possible for a resin to fully permeate between the monofilaments when the prepreg is impregnated with the resin. Therefore, the prepreg using the spreaded glass rovings without being doubled is such that the monofilaments are arranged in an orderly manner and the resin is homogeneously permeated, so that it can have excellent physical properties such as strength. In addition, the prepreg does not include voids between the monofilaments, so that it is well clear and not whitish, and further the prepreg would have a highly smooth surface.

The present invention has been made based on the above findings.

In accordance with the present invention, glass fiber roving without being doubled may be used as the reinforcing fiber of the unidirectional thin glass prepreg, the roving consisting of glass fiber monofilaments each having a diameter of 10 to 20 μm. Monofilaments having a diameter less than 10 μm are not sufficiently tough to strengthen to a sufficient degree a prepreg which includes these monofilaments as reinforcement. To the contrary, if the monofilament diameter is greater than about 20 μm, it is so thick that a matrix resin cannot sufficiently adhere to it. Therefore, the monofilaments of the roving without being doubled should have diameter of 10 to 20 μm, preferably 13 to 15 μm.

The number of monofilaments converged to form a roving without being doubled is not particularly limited in the invention. However, the number should be about 2,000 at most, since, in a thin prepreg of the invention, gaps are more likely to occur between monofilaments as the number of converged monofilaments increases. When the number of converged monofilaments in one roving is less, there occur no particular problems except that a larger number of rovings without being doubled must be used. A particularly preferred number of converged monofilaments is about 1,600.

The sizing agent used for the convergence of monofilaments of a roving without being doubled should be one of the same family as the matrix resin used in the prepreg so that the monofilaments can have a good conformability with the matrix. The amount of the sizing agent adhering to the roving without being doubled is dependent on the type or kind of the agent but, in general, should preferably be small from the view point of spreadability. If, however, the adhering amount of the sizing agent is too small, the roving becomes hard to handle. The adhering amount of the sizing agent should therefore be determined in consideration of the handling ability. When an epoxy type sizing agent, for example, is used, it should preferably be 0.1 to 1.0% by weight, and more preferably 0.2 to 0.6% by weight.

The matrix resin used in the unidirectional thin glass prepreg is required to be excellent in strength and clarity, and may be a thermosetting matrix resin, such as epoxy resin, unsaturated polyester resin, polyurethane resin, diallyl phthalate resin, or phenol resin. A curing agent and other suitable additives, such as a flexibility-imparting agent, may be added so that the matrix resin can have a curing temperature of 50° to 150° C.

For example, epoxy resins may preferably be used as the matrix resin. Available epoxy resins include, for example, (1) glycidilether type epoxy resins (bisphenol A, F, or S type epoxy resins, novolak type epoxy resins, brominated bisphenol A type epoxy resins); (2) cyclic aliphatic epoxy resins; (3) glycidilester type epoxy resins; (4) glycidilamine type epoxy resins; (5) heterocyclic epoxy resins; and other various types of epoxy resins. One or more resins selected from these may be used. Specifically, bisphenol A, F or S glycidilamine type epoxy resins may preferably be used. As the curing agent, diaminophenylsulfone (DDS), or diaminodiphenylmethane (DDM), for example, may preferably be used.

The matrix resin should have a viscosity which has a low value when it is applied to paper for preparing resin coated paper, and which has a value of about 1,000 to about 20,000 centipoise during the coating process. More preferably, it should be 1,500 to 3,000 centipoise.

This is because, on the one hand, the matrix resin will flow, allowing the arranged monofilaments to flow and become out of order during the manufacture of a prepreg, if the matrix resin viscosity is too low, and, on the other hand, the resin will not sufficiently permeate between the monofilaments, causing ununiformity of impregnation, if the viscosity is too high.

In accordance with the present invention, the unidirectional thin glass prepreg may have a net thickness, not including the thickness of the release paper, of 50 to 150 μm. If the prepreg is too thin, i.e. its thickness is less than about 50 μm, then it cannot sufficiently reinforce an intended object to be strengthened by it. If the prepreg has a thickness larger than 150 μm, then it is too thick and is unsuitable for some kinds of use such as ornamental uses on objects, for example fishing rods or golf club shafts.

The unidirectional thin glass prepreg of the present invention may be continuously manufactured by spreading a glass roving without being doubled, while arranging the spreaded glass fiber monofilaments in one direction in a thin layer between the insides of two sheets of resin coated paper, the inside of which is coated with a matrix resin, and applying heat and pressure to them from the outsides of the two sheets of resin coated paper so that the resin can permeate between the monofilaments and can simultaneously become B-staged. Alternatively, it may be manufactured by a batch process, in which the roving without being doubled is spreaded while the spreaded monofilaments of the roving being arranged in one direction in a thin layer and simultaneously wound around a resin coated paper sheet which is wound on a drum, and thereafter the resin-coated paper sheet is removed from the drum and is subjected to the above-described heat and pressure process.

The invention will further be described, by way of example.

EXAMPLE

In accordance with the present invention, glass fibers in the form of a roving without being doubled was used as reinforcing fiber to produce unidirectional thin glass prepregs (Invention Nos. 1–4). For comparison purposes, other unidirectional thin glass prepregs (Comparison Nos. 1–4) were also produced under conditions at least part of which was out of the range prescribed by the present invention. All of these prepregs were produced in accordance with the above-mentioned continuous process.

Table 1 shows data of the invention prepreg Nos. 1–4 and comparison prepreg Nos. 1–4, representing: used matrix resin; amount of applied matrix resin per unit area of the resin coated paper (two, upper and lower, resin coated paper sheets were used); the number of used rovings without being doubled per a width of 300 mm of prepreg; heating temperature during impregnating with the resin the monofilaments of rovings without being doubled; and the type (trade name) of used rovings without being doubled.

Table 2 shows data representing the prepreg producing conditions of: whether the used roving is a roving without being doubled or an ordinary roving; the number of converged monofilaments of the roving; monofilament diameter (fiber diameter); TEX; the amount of applied sizing agent; the type of the sizing agent, i.e. whether it is an epoxy agent or a thermpolastic agent; the resin viscosity during coating; and the amount (Vf)

of monofilaments contained in the prepreg, together with properties of the obtained prepreg of: thickness; resin impregnation ununiformity; fluctuation of monofilaments (fluctuation of threads); gap between monofilaments; and surface smoothness.

the use of a thermosetting sizing agent, and comparison prepreg Nos. 2 and 4 are poor in the property of resin impregnation ununiformity due to the use of rovings without being doubled comprising a thick monofilaments having a large diameter of 23 μm. Further, due to

TABLE 1

|  | Invention | | Comparison | | | Invention | | Comparison |
|---|---|---|---|---|---|---|---|---|
|  | No. 1 | No. 2 | No. 1 | No. 2 | No. 3 | No. 3 | No. 4 | No. 4 |
| Coated resin | Epoxy | | Epoxy | | | Epoxy | | Epoxy |
| Applied resin amount (g/m²) | 39 | 39 | 39 | 39 | 39 | 28 | 39 | 60 |
| Number of rovings (1/300 mm width) | 85 | 85 | 85 | 34 | 85 | 58 | 85 | 52 |
| Heating temperature (°C.) | 90 | 90 | 90 | 90 | 90 | 90 | 75 | 75 |
| Type of roving | ER 575 TK F08 | ER 575 TK FT594 | R 4450 TT FT599 | ER 530 F-65 | | ER 575 TK F08 | | R 4450 TT FT599 |

TABLE 2

|  | Invention | | Comparison | | | Invention | | Comparison |
|---|---|---|---|---|---|---|---|---|
|  | No. 1 | No. 2 | No. 1 | No. 2 | No. 3 | No. 3 | No. 4 | No. 4 |
| Type of roving | Without being doubled | | without being doubled | | Ordinary | Without being doubled | | Without being doubled |
| Number of converged monofilaments | 1600 | 1600 | 1600 | 4000 | 1500 | 1600 | 1600 | 4000 |
| Monofilament diameter (μm) | 13 | 13 | 13 | 23 | 13 | 13 | 13 | 23 |
| TEX (g/km) | 575 | 575 | 575 | 4450 | 530 | 575 | 575 | 4450 |
| Amount of applied sizing agent (wt %) | 0.23 | 0.58 | 0.20 | 0.25 | 0.5 | 0.23 | 0.23 | 0.25 |
| Type of sizing agent | Epoxy | | Thermo-plastic | | Epoxy | Epoxy | | Thermo-plastic |
| Resin viscosity during coating (cps) | 2000 | 2000 | 2000 | 2000 | 2000 | 2000 | 5000 | 5000 |
| $V_f$(%) | 49 | 49 | 49 | 49 | 49 | 45 | 49 | 49 |
| Prepreg properties | | | | | | | | |
| Thickness (μm) | 130 | 130 | 130 | 130 | 130 | 90 | 130 | 200 |
| Impregnation ununiformity | ⊙ | ο | x | x | x | ⊙ | ο | Δ |
| Fluctuation of threads | ⊙ | ⊙ | ⊙ | Δ | x | ⊙ | ⊙ | ⊙ |
| Gap | ⊙ | ⊙ | ⊙ | x | Δ | ⊙ | ⊙ | ο |
| Surface smoothness | ⊙ | ⊙ | ⊙ | ο | x | ⊙ | ⊙ | ο |

In Table 2, "fluctuation of threads" indicates the degree of unidirectionality of the arranged monofilaments. "Impregnation ununiformity" designates a situation where voids are present, making the prepreg whitish and locally unclear, because of insufficient permeation of the resin between the monofilaments. If the resin used is colored, then the prepreg would also be ununiformly colored.

In Table 2, the symbol "⊙" represents a prepreg having very good properties, while "ο" represents a prepreg having good properties. Prepregs given either of these symbols are within the range of acceptance. The symbol "Δ" represents a prepreg having poor properties and "x" represents a prepreg having significantly poor properties, and prepregs with these symbols are out of the range of acceptance.

The used roving without being doubled were from Asahi Fiber Glass Inc., and the used ordinary rovings were from Nippon Denki Glass Inc.

As will be clear from Table 2, the invention prepreg Nos. 1–4 are excellent in all of the listed properties. More specifically, very good results have been obtained in all the properties except the resin impregnation ununiformity of prepreg Nos. 2 and 4, No. 2 prepreg having a large amount, 0.58% by weight, of an applied sizing agent, and No. 4 prepreg having a large coated resin viscosity of 5,000 centipoise.

In contrast, comparison prepreg No. 1 is very poor in the property of resin impregnation ununiformity due to the use of an ordinary glass roving, comparison prepreg No. 3 is very poor in the properties of resin impregnation ununiformity, fluctuation of threads, and surface smoothness, and it is poor in the property of gap.

ADVANTAGES OF THE INVENTION

As will be clear from the foregoing, the unidirectional thin glass prepreg according to the present invention comprises glass diver monofilaments which are formed by spreading glass rovings without being doubled and which are unidirectionally arranged in one direction in a thin layer, and a matrix resin, wherein the monofilaments have a diameter of 10 to 20 μm, and the prepreg has a thickness of 50 to 150 μm.

Consequently, when the glass rovings without being doubled are spreaded and the spreaded glass monofilaments of the rovings are unidirectionally arranged in a thin layer on a resin coated paper sheet, or between two resin coated paper sheet, the arranged monofilaments are orderly and are not twisted, distorted or wound around one another. Therefore, it is possible for a resin to fully permeate between the monofilaments when the prepreg is impregnated with the resin.

The unidirectional thin glass prepreg of the invention provides the advantages that the monofilaments are arranged in an orderly manner and the resin is homogeneously permeated, so that it can have excellent physical properties such as strength. In addition, the present prepreg does not include voids between the monofilaments, so that it is well clear and not whitish. Further, the prepreg would have a highly smooth surface.

What is claimed is:

1. A flexible, unidirectional thin glass prepreg having a thickness of 50 to 150 μm, said glass prepreg comprising:
   (a) glass fiber monofilaments which are formed by spreading glass rovings without being doubled and which are simultaneously arranged in one direction in a thin layer,
   (b) each of said glass rovings, without being doubled, is manufactured by a single converging operation of glass diver monofilaments into a roving form, each of said fiber monofilaments having a diameter of 10 to 20 μm, and
   (c) a matrix resin which is impregnated between the fiber monofilaments and then partially cured.

2. A unidirectional thin glass prepreg according to claim 1, wherein said matrix resin is an epoxy type resin.

3. A unidirectional thin glass prepreg according to claim 1, wherein each of said glass rovings contains less than 2000 converged monofilaments.

4. A unidirectional thin glass prepreg according to claim 2, wherein each of said glass rovings contains less than 2000 converged monofilaments.

* * * * *